(12) United States Patent
Crites

(10) Patent No.: US 10,706,428 B2
(45) Date of Patent: Jul. 7, 2020

(54) METHOD FOR CONTACT STREAM OPTIMIZATION

(75) Inventor: Robert Crites, Hummelstown, PA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 3202 days.

(21) Appl. No.: 10/015,548

(22) Filed: Dec. 11, 2001

(65) Prior Publication Data

US 2003/0110119 A1 Jun. 12, 2003

(51) Int. Cl.
*G06Q 30/02* (2012.01)
*G06Q 40/04* (2012.01)

(52) U.S. Cl.
CPC ......... *G06Q 30/02* (2013.01); *G06Q 30/0244* (2013.01); *G06Q 30/0247* (2013.01); *G06Q 30/0249* (2013.01); *G06Q 40/04* (2013.01)

(58) Field of Classification Search
USPC .................................................. 705/14, 14.1
See application file for complete search history.

(56) References Cited

U.S. PATENT DOCUMENTS

| 6,460,036 | B1* | 10/2002 | Herz | G06Q 30/02 707/748 |
| 6,847,934 | B1* | 1/2005 | Lin | G06Q 10/06375 705/7.37 |
| 6,993,493 | B1* | 1/2006 | Galperin et al. | 705/7.29 |
| 7,552,069 | B2* | 6/2009 | Kepecs | G06Q 30/02 705/14.25 |
| 2001/0014868 | A1* | 8/2001 | Herz et al. | 705/14 |
| 2001/0032128 | A1* | 10/2001 | Kepecs | 705/14 |
| 2002/0128904 | A1* | 9/2002 | Carruthers | G06Q 30/02 705/14.43 |
| 2002/0169654 | A1* | 11/2002 | Santos | G06Q 30/02 705/14.48 |
| 2003/0130887 | A1* | 7/2003 | Nathaniel | G06Q 10/02 705/14.73 |
| 2005/0289000 | A1* | 12/2005 | Chiang | G06Q 30/02 705/7.35 |

FOREIGN PATENT DOCUMENTS

WO   WO 2001/077970 A2 * 10/2001 ............. G06Q 30/06

* cited by examiner

*Primary Examiner* — David J Stoltenberg
(74) *Attorney, Agent, or Firm* — Cuenot, Forsythe & Kim, LLC

(57) ABSTRACT

Techniques for determining a prioritized listing of offers for use to contact potential customers are described. The technique includes generating an ordered listing of offers from a set of offers, by which to contact a potential customer from a group of potential customers by considering the potential customer independently from others of the potential customers in the group, during generating of the ordered listing of offers for the potential customer.

30 Claims, 8 Drawing Sheets

METHOD FOR CONTACT STREAM OPTIMIZATION

BACKGROUND

This invention relates to contact stream optimization.

Organizations that desire to conduct a marketing campaign may have multiple contacts with a single customer. For example, an organization can send many different kinds of specialty catalogs to the same customer over a short period of time. Organizations may desire to limit the number of catalogs that are sent to the customer for various reasons. For example, if somebody receives a large number of catalogs from the same organization, they could simply ignore all subsequent mailings from that organization.

Techniques are known to solve what is often referred to as contact optimization. That is, to determine an optimal set of contacts to make with an individual over a period of time given global constraints placed by a marketing organization. One technique uses linear programming. Linear programming solves a system of linear inequalities. The problem is that for a large number of customers and offers the number of variables in these types of optimization problems may run into the millions, which could make a linear programming technique too computationally expensive.

SUMMARY

According to an aspect of the present invention, a method of determining a prioritized listing of offers for use to contact potential customers includes generating an ordered listing of offers from a set of offers, by which to contact a potential customer from a group of potential customers by considering the potential customer independently from others of the potential customers in the group, during generating of the ordered listing of offers for the potential customer.

According to an aspect of the present invention, a method of determining a prioritized number of contacts to customers from a group of customers includes determining an ordered set of offers to be sent to each customer. For each customer the method also includes eliminating any offers that are not applicable to the customer based on eligibility rules for the offers or offers for which an expected profit for the customer is below a threshold amount and ordering remaining offers by expected profit.

According to an aspect of the present invention, a computer program product resides on a computer readable medium. The product determines a prioritized number of offers to use to contact customers from a group of customers. The product comprises instructions to cause a computer to determine an ordered set of offers to be sent to each customer. For each customer, the product eliminates any offers that are not applicable to the customer based on eligibility rules for the offers or offers for which an expected profit for the customer is below a threshold amount and orders remaining offers by expected profit.

According to an aspect of the present invention, a system for determining a prioritized number of offers to send to customers from a group of customers includes a computer and a computer readable medium storing a computer program product. The computer program product includes instructions for determining the prioritized number of offers and determine an ordered set of offers to be sent to each customer. For each customer the product eliminates any offers that are not applicable to the customer based on eligibility rules for the offers or offers for which an expected profit for the customer is below a threshold amount. The product orders remaining offers by expected profit.

One or more of the following alternatives may be provided by one or more aspects of the present invention.

The invention allows a process to look at customers on an individual basis. Looking at the customers on an independent basis provides a process that is computationally inexpensive compared to prior techniques such as linear programming, which look at all customers together. The invention provides a much more streamlined technique that provides an optimal solution as long as there are no limits on the number of customers that you can send any particular offer and a near optimal solution otherwise.

Aspects of the invention include a bit string or array to represent the set of offers that will be sent to each customer. The bit string is a very efficient way to deal with the constraints and track which offers to send to customers. The bit string allows easy and computationally inexpensive prioritization of offers. Another advantage is that aspects of the invention allow different entities within an organization having different kinds of solicitations to be coordinated by a single decision maker that can decide which is the best subset of offers to send out.

DETAILED DESCRIPTION

Figure 1:
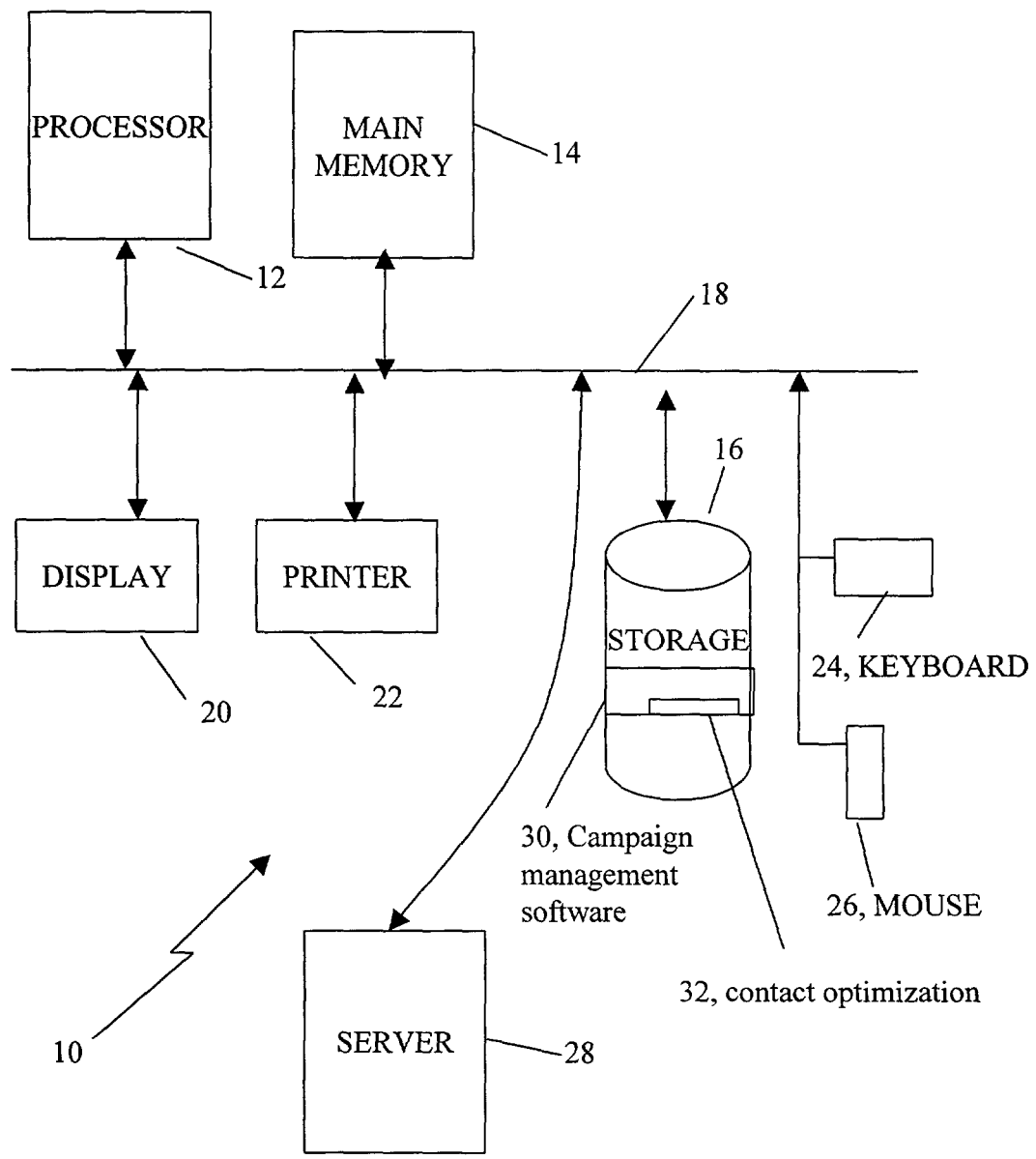
FIG. 1 is a block diagram of a computer system executing data mining software including contact optimization software.

Referring now to FIG. 1, a computer system 10 includes a CPU 12, main memory 14 and persistent storage device 16 all coupled via a computer bus 18. The system 10 also includes output devices such as a display 20 and a printer 22, as well as user-input devices such as a keyboard 24 and a mouse 26. Not shown in FIG. 1 but necessarily included in a system of FIG. 1 are software drivers and hardware interfaces to couple all the aforementioned elements to the CPU 12.

The computer system 10 also includes automated campaign management software 30 that includes contact optimization software 32 that prioritizes offers sent to multiple contacts based on given criteria. The contact optimization software 32 provides a streamlined technique that should execute faster than linear programming solutions, and which can find an optimal solution if there are no limits on the number of customers per offer, and can find a nearly optimal solution otherwise.

The contact optimization software 32 considers each customer independently, and supports eligibility constraints as well as rules of the form (M,S), i.e., "only M offers from set S are allowed". These "M of S" type rules can be used to support mutually exclusive offers, as well as channel and other constraints. The contact optimization software 32 also supports an overall budget.

The automated campaign management software 30 and contact optimization software 32 may reside on the computer system 10, as shown, or may reside on a server 28 that is coupled to the computer system 10 in a conventional client-server arrangement. The details on how this automated campaign management software 30 and contact optimization software 32 is coupled to this computer system 10 are not important to understand the present invention.

Generally, data mining software (not shown) executes complex data modeling algorithms such as linear regression, logistic regression, back propagation neural network, Classification and Regression Trees (CART) and Chi-squared Automatic Interaction Detection (CHAID) decision trees, as well as other types of algorithms that operate on a data set. Also, the data mining software can use any one of these algorithms with different modeling parameters to produce different results. The data mining software can render a visual representation of the results on the display 20 or printer 22 to provide a decision maker or the automated campaign management software 30 with the results. The results that are returned can be based on different algorithm types or different sets of parameters used with the same algorithm. The results can be returned with or without a visual depiction of the results such as the score itself, calculating an RMS value, and so forth. One approach is to render a graph or other visual depiction of the results. Part of the results returned could include a predicted or expected profit that can result from sending a particular offer to a particular customer or potential customer or contact.

Figure 2A:
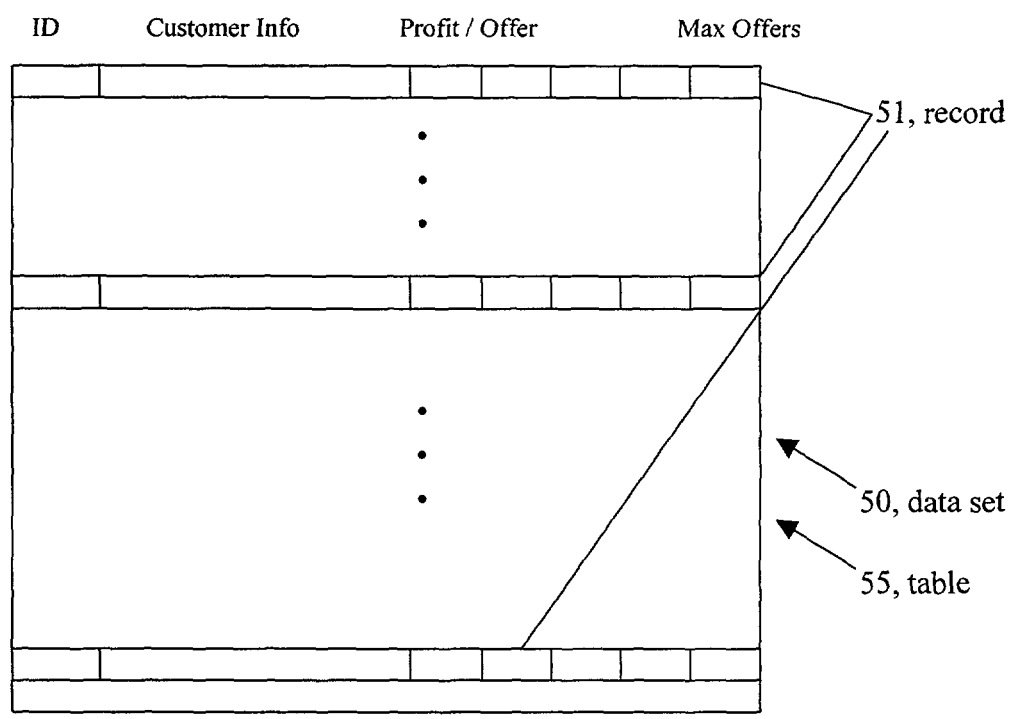
FIG. 2A is a block diagram of a table of records.
Figure 2B:
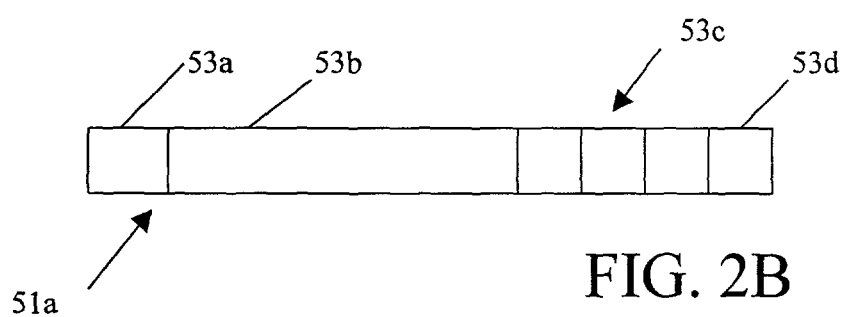
FIG. 2B is a diagram of a record.

Referring now to FIGS. 2A and 2B, a data set 50 includes a plurality of records 51. A customer is represented by a record 51. The records 51 are organized into a table 55. The customer data inputs are stored in the records 51. The records 51 (FIG. 2A) include an identifier field 53a and a plurality of fields 53b containing customer information that may be needed for determining each customer's eligibility to receive each offer or for computing the expected profit from sending each customer each offer. The records 51 also include fields 53c for expected profit corresponding to offers that are used in the contact optimization process 32, that could have been previously computed. In the table 55, each record 51 represents a customer in rows of the table and each column represents information about the customers such as identifiers, eligibility information, expected profits from the offers, the maximum number of offers per customer, and so forth.

The expected profit would be determined by modeling characteristics of the customer using one of many different types of algorithms, as mentioned above. The expected profit could be the output from a model or some formulas for computing the expected profit. For example, a model might predict the response rate that is multiplied by the expected revenue from that particular offer. To determine the expected profit, the cost of sending that offer is subtracted from revenue.

Another field 53d in the record 51 and entry in the table 55 is the maximum number of offers that can be sent to each customer. The maximum number of offers field 53d can be represented as a vector (as shown), or as a scalar, i.e., a string of maximums for the customers or a single maximum number for all customers.

Constraints are imposed by a marketing organization and are processed in the contact optimization software 32. One type of constraint is a rule. There are a variety of different types of rules and constraints that are supported by the contact optimization process. There are many different kinds of such rules that a user can generate.

(1) "Eligibility constraints" are examples of rules that are applied with respect to each current offer and considered independently. The rules are represented by expressions having arithmetic, relational, logical, and/or other operators acting upon customer input data. An example is a customer meeting a minimum salary requirement. These type of constraints can also be used to implement temporal constraints among offers, e.g., if a customer received offer X within the past 3 months (according to the customer input data), then they are not currently eligible to be sent offer Y.

(2) "Limits on the number of offers per customer". This is a type of rule where each customer is limited to receive no more than some maximum number of offers. The limit may vary among the customers.

(3) "(M,S) rules". These are rules where no more than M offers from set S of offers may be sent to any customer. These rules are applied with respect to combinations of current offers and are not based on customer input data. Channel constraints are a particularly useful capability provided by (M,S) rules, e.g., if at most one offer can be sent via email, and offers 3, 4, and 6 are email offers, this constraint can be enforced as the following (M,S) rule: (1, {3,4,6}). Mutually exclusive offers can also be accommodated using (M,S) rules.

(4) "Overall budget constraints". These rules are governed by overall marketing costs. These rules can be applied when marketing costs need to be limited to some maximum amount.

(5) "Maximum capacity constraints". These rules express limits on the number of customers per offer, possibly due to limitations in the supply of either products or marketing materials.

(6) "Minimum capacity constraints". These rules are applied where some minimum number of a particular offer are to be sent out, regardless of profit. For example, this might be used if a fixed amount of marketing materials have already been purchased, and it is desired that they not be wasted.

Figure 3:
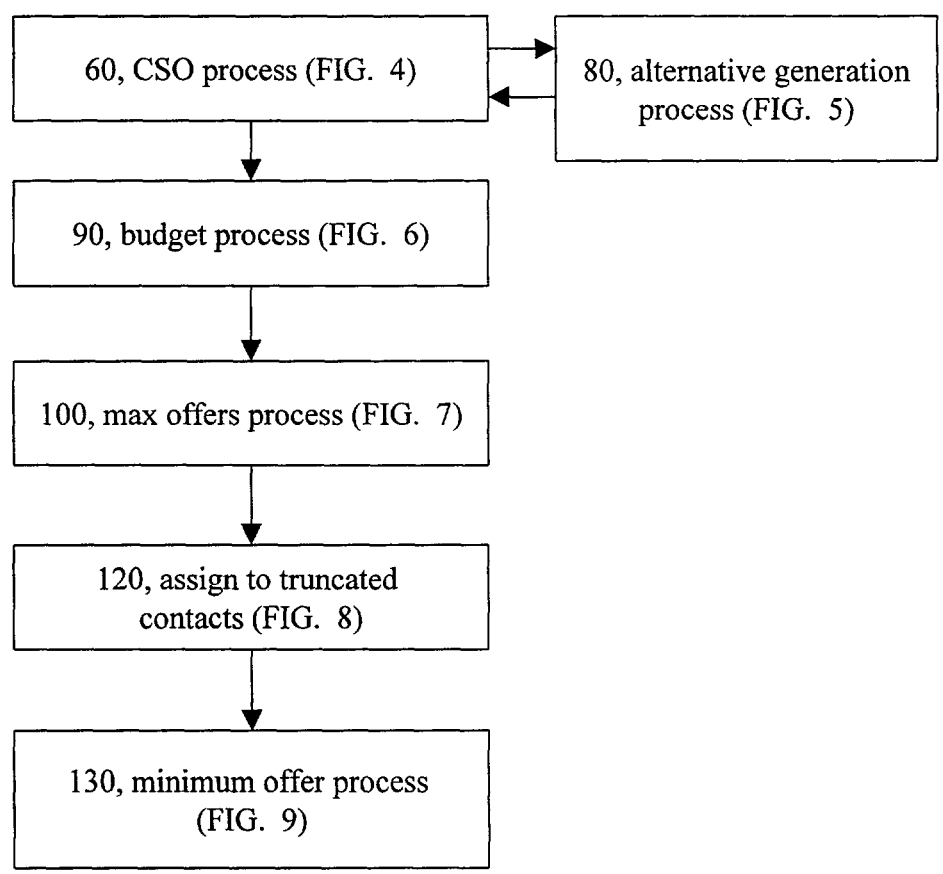
FIG. 3 is a flow chart that depicts components of contact optimization.

Referring to FIG. 3, contact optimization software 32 executes a contact optimization process 60 that selects an optimal set of offers to send to each customer. By optimal is meant that the numbers of offers to send are selected to maximize profit and possibly stay within a budget, while satisfying any given constraints. For example, in one campaign it might actually seem more profitable to make four contacts with a particular customer. But, the maximum contacts allowed for the particular campaign may be three contacts due to budget constraints. Within the constraints given the contact optimization process selects the most profitable combination of offers for each customer. The contact optimization process proceeds on a customer-by-customer basis.

This process 60 is run for each customer individually. An example of the contact optimization process 60 is set out in FIG. 4 below. As will be described in FIG. 4 the contact optimization process 60 for each customer, filters out illegal offers and orders remaining offers by expected profit. The process 60 represents remaining offers as a bit string and generates an initial proposed solution that is checked against all (M,S) type rules. If all rules are satisfied the proposed solution is accepted for the customer and the process 60 evaluates the next customer. The contact optimization software 32 executes an alternative generation process 80 as set out in FIG. 5 whenever rules of the type (M,S) are violated by a proposed solution for a given customer.

Figure 6:
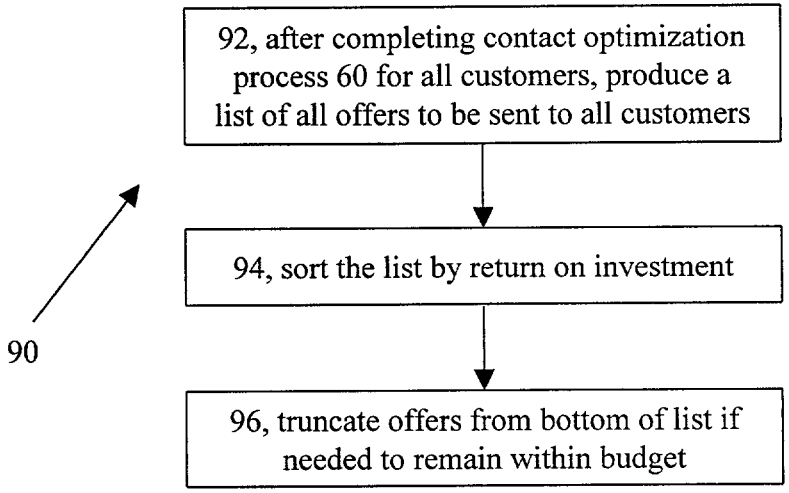
FIG. 6 is a flow chart of a budget process.

After all customers have been evaluated the contact optimization software 32 executes a budget process 90 as described in FIG. 6. The contact optimization software 32 can include a process 100 to assign offers to customers based on constraints that impose a maximum amount of any given offer, as in FIG. 7. The contact optimization software 32 can include a process 120 as in FIG. 8 to reassign offers to customers that were truncated by the process of FIG. 7. The contact optimization software 32 can also include a process 130 to evaluate rules dealing with minimum capacity of offers as in FIG. 9.

Figure 4:
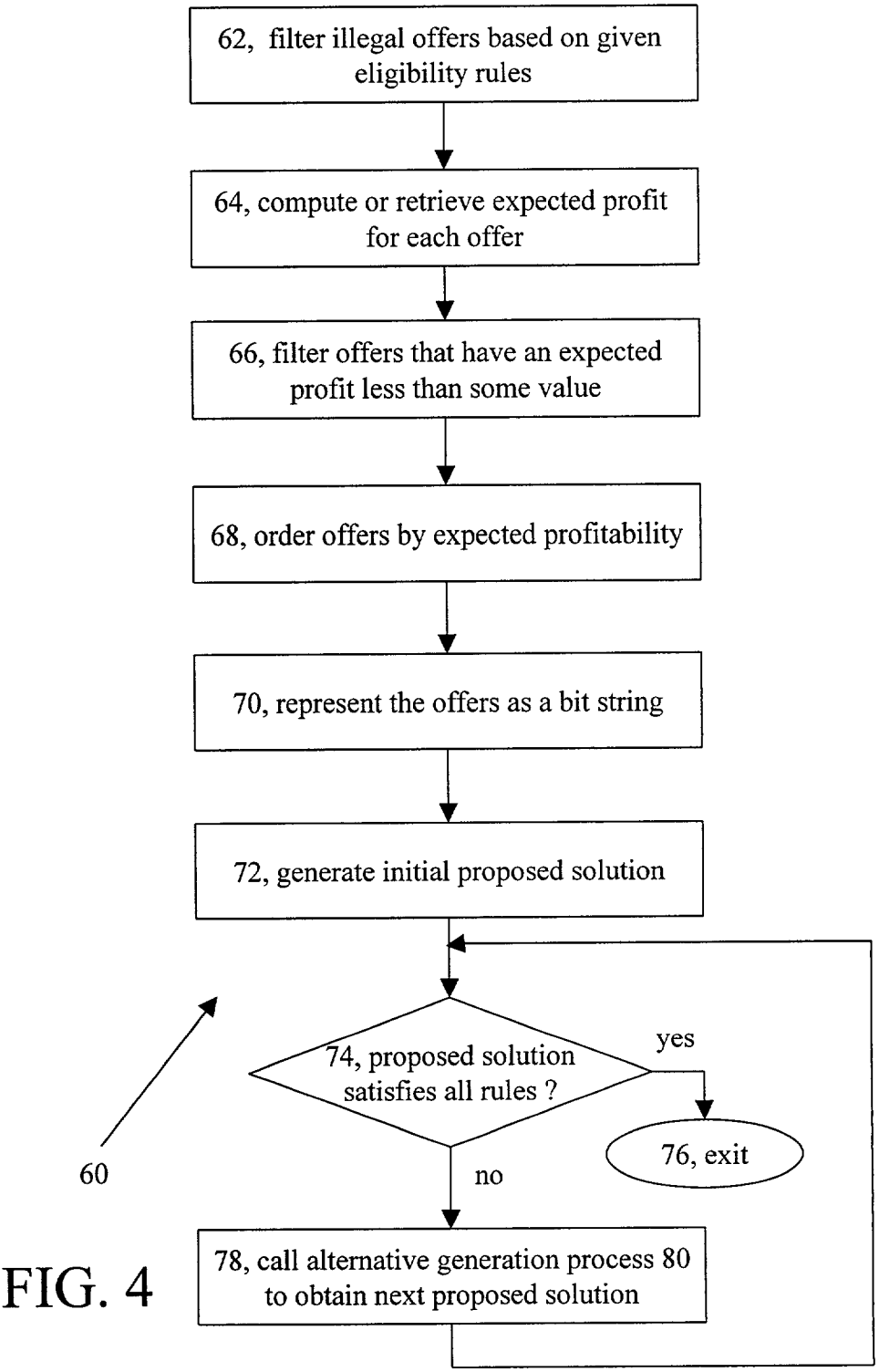
FIG. 4 is a flow chart of a contact optimization process.

Referring to FIG. 4, an example of the contact optimization process is shown. For each particular customer, the contact optimization process 60 filters 62 out any illegal offers based on given eligibility type rules as discussed above. One example was given above whether the current customer has a specified income level to receive the present offer and so forth. The contact optimization process 60 computes 64 the expected profit for each offer for that particular customer unless it is provided, in which case the expected profit can be retrieved. The contact optimization process 60 filters 66 out any offers that have an expected profit less than or equal to zero or some other value. The contact optimization process 60 orders 68 the remaining offers by their expected profitability.

The contact optimization process 60 represents 70 the offers as a bit string. The length of the bit string is the total number of offers that are still valid for the customer after all of the filtering processes discussed above. The length of the bit string is the number of zeros and ones in the string with each bit representing one of the offers. The bits are ordered by the expected profit. Illustratively, assume that the left most bit is the most profitable offer and the right most the least profitable. A "one" indicates send the offer to that customer and a "zero" indicates do not send the offer.

The contact optimization process 60 starts by generating 72 the most profitable bit string as the initial proposed solution. The initial proposed solution is generated in a way that obeys any limit on the number of offers for the customer. For example, if "N" is the maximum number of offers for the customer, the initial proposed solution will be the string that has the first N bits as ones and bits thereafter as zeros. For example, if N=4 with 10 possible offers, the initial proposed solution will be (1111000000).

The contact optimization process 60 will test 74 to see if the proposed solution violates any rules or constraints of the "(M,S)" type. If that string does not violate any (M,S) type rules or constraints, then that is the answer and the process exits 76. Otherwise, the contact optimization process 60 will generate 78 the next most profitable alternative string as a proposed solution, which will be tested 74. The contact optimization process 60 will continue to generate and test alternative solutions in this manner until a solution is found that does not violate any rules or constraints.

When testing proposed solutions against (M,S) type rules, the contact optimization process 60 can achieve greater computational efficiency by ordering the (M,S) rules in an intelligent way. For example, the process 60 can give priority to testing rules that have the lowest values M and the largest sets S because evaluation of those rules against potential sets of offers most quickly tend to restrict the space of possible solutions.

Figure 5:
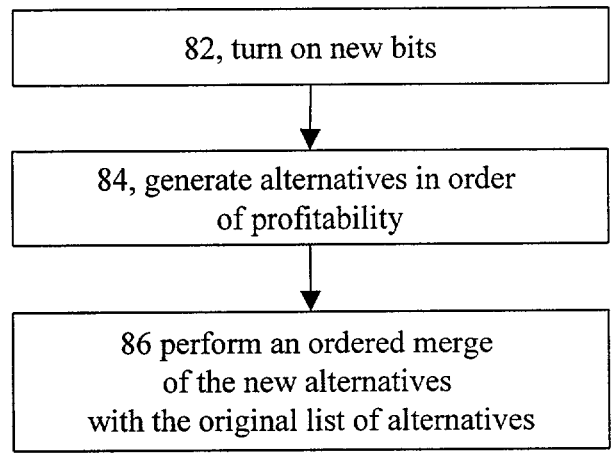
FIG. 5 is a flow chart of an alternative generation process.

Referring to FIG. 5, if there is some rule violated, the contact optimization process 60 calls 78 an alternative generation process 80 that generates one or more alternative solutions. The alternative generation process 80 turns on 82 new bits that will be on in all of the alternative solutions generated. The alternative generation process 80 generates 84 alternative solutions in order of profitability, and performs 86 an ordered merge of the new alternatives with the original list of alternatives. The merge 86 essentially interleaves the alternatives with the original list as appropriate to retain the overall profitability order. That is, the alternative generation process 80 generates new alternatives in the order of profitability and merges them into an alternative list retaining the profitability order.

For example, the current list contains three alternative solutions with profitability "100", "50", and "25". The alternative generation process 80 generates two additional alternative solutions with profitability "150" and "75". By merging 86, the alternative generation process 80 retains the profitability order of the alternative solutions producing a new list ordered as "150", "100", "75", "50", and "25".

Referring back to FIG. 4, the alternative solution with the highest profitability "150" is the next proposed solution to be tested 74 to see if all rules are satisfied.

Details of the actions of the alternative generation process 80 are set out below. The alternative generation process 80 produces a set of new alternatives when a rule of the (M,S) type, i.e., "only M offers from set S are allowed" is violated. If such a rule is violated, some number of bits T greater than M bits from the set S were on. Call the rightmost one bit in the string, R1. The new alternative generation process turns on 82 (T−M) new bits that are not a part of set S changing the new offers from a zero bit to a one bit. The bits representing these offers immediately follow R1 until no more bits are left.

For example, the string (1111000000) represents sending the 4 most profitable out of 10 possible offers. In this example, the string violates a rule that says "only one of the first two offers" is allowed. That means that the first two offers are mutually exclusive. In this example, the rightmost one bit is the fourth bit hence R1 is four.

The alternative generation process 80 will turn on 82 (T−M) new bits. In this case M is "one", because only one offer out of the offers from set S that contains offer one and offer two, is allowed. In the example string, (1111000000), a number T of those bits from set S are on (T is 2). Since the number T is greater than M (M is 1), the process turns on T−M new bits (2−1=1), i.e., one bit. That bit is not a part of set S and immediately follows bit R1 (bit 4). Let the rightmost new bit be called R2 (in this example R2=bit 5). The process 80 generates new alternatives based on all M bit combinations of the T bits up to R1 and any 0 bits in set S between R1 and R2. In the example, the alternative generation process 80 turns on bit number 5 because that bit immediately follows bit R1 and is not a part of set S.

If the alternative generation process 80 reaches the end of the string and there are no possible bits representing offers that the alternative generation process 80 could turn on, (case not shown) then the alternative generation process 80 does not turn on any more bits. In some cases, the alternative generation process 80 may need to turn on multiple bits.

After the alternative generation process 80 turns on a new bit, the alternative generation process 80 generates 84 an alternative list based on all bit combinations of the T 1 bits up to R1, and any zero bits in set S between R1 and R2. In this case, the T 1 bits (T is 2) are the first two bits. The alternative generation process 80 tries all possible combinations. All M bit combinations (for M=1) are tested, i.e., all the combinations where only one of the first two bits is turned on, either (10) or (01). In this case, there are two combinations that can be generated. The process 80 can use a mathematical function for the number of combinations of T elements taken M at a time $$C(T,M)=T!/(M!*(T-M)!)$$

to determine how many different alternatives will be generated, e.g., C(2,1)=2.

The alternative generation process 80 generates these alternatives in order of profitability. In this case, with only two alternatives, the (10) alternative has to be better than the (01) alternative because the process has ranked the offers by profitability.

But in cases where multiple bits are turned on the combinations often need to be further examined. For example, where 2 out of 4 bits can be turned on, there are 6 combinations and the alternative generation process 80 generates 84 the combinations (1100), (1010), (1001), (0110), (0101), and (0011). All of the combinations are generated in order with the possible exception of the (1001) and (0110) combinations. The combinations are generated in order when more profitable bits are only swapped with less profitable bits. The combinations are not necessarily generated in order when both more and less profitable bits are swapped to generate a new combination as in the (1001) and (0110) combinations.

In that case, the process 84 performs a comparison. In the example, the process 84 compares the sum of the profitability of the first offer and the fourth offer to the sum of the profitability of the second offer and the third offer. Even though the individual offers are already ranked the process performs the additional comparisons to maximize the total profitability of the set of offers.

A recurrence relation for the number of additional comparisons needed is set out below:
Comp(a 1)=0
Comp(aa−1)=0
Comp(ab)=Comp(a−b−1)+Comp(a−1 b)+1 (where 1<b<a−1)
In the example above with 2 out of 4 bits to turn on, a=4 and b=2, so one additional comparison is needed:

$$Comp(42) = Comp(31) + Comp(32) + 1$$
$$= 0 + 0 + 1$$
$$= 1$$

Some examples of generating new alternatives:

Example 1

If ordered bit string of offers (1111000000) violates a rule (1, {1,2}), which means that offers 1 and 2 are mutually exclusive, the sorted alternatives generated would be:
(1011100000) and (0111100000).
If ordered bit string (1011100000) then violates another rule (2, {3,4,5,7}), meaning that only 2 offers from the group of offers 3, 4, 5 and 7 can be sent, the sorted alternatives generated would be:
(1011010000), (1010110000), and (1001110000),
which would be merged with the already sorted list containing (0111100000).
However, if the ordered bit string (1011100000) violated another rule (2, {3,4,5,6}), the alternatives generated would be:
(1011001000), (1010101000), (1010011000), (1001101000), (1001011000), and (1000111000).

If the ordered bit string (0010001100) violated another rule (2, {3,4,6,7,8,10}), the sorted alternatives generated would be:
(0010001010), (0010000110), and (0000001110).

Referring to FIG. 6, the contact optimization software 32 can accommodate an overall budget constraint as discussed above. In that case, after the contact optimization process 60 has determined the optimal set of offers for all potential customers, the budget process 90 produces 92 a corresponding single list of all of the offers to send to all of the customers. The budget process 90 sorts 94 that list by return on investment (ROI) such that a user can send out as many offers as fit within the budget. Any remaining offers that do not fit within the budget are truncated 96 off the bottom of the list of offers.

Many users could operate the contact optimization software 32 with a maximum budget to spend on contacting customers during marketing campaigns. This contact optimization software 32 partly prioritizes based on rules to minimize contacts with customers to avoid annoying the customers with excessive contacts in addition to supporting an overall budgetary constraint. The contact optimization software 32 allows a user to deal with both of those constraints at the same time and in the most profitable way.

Figure 7:
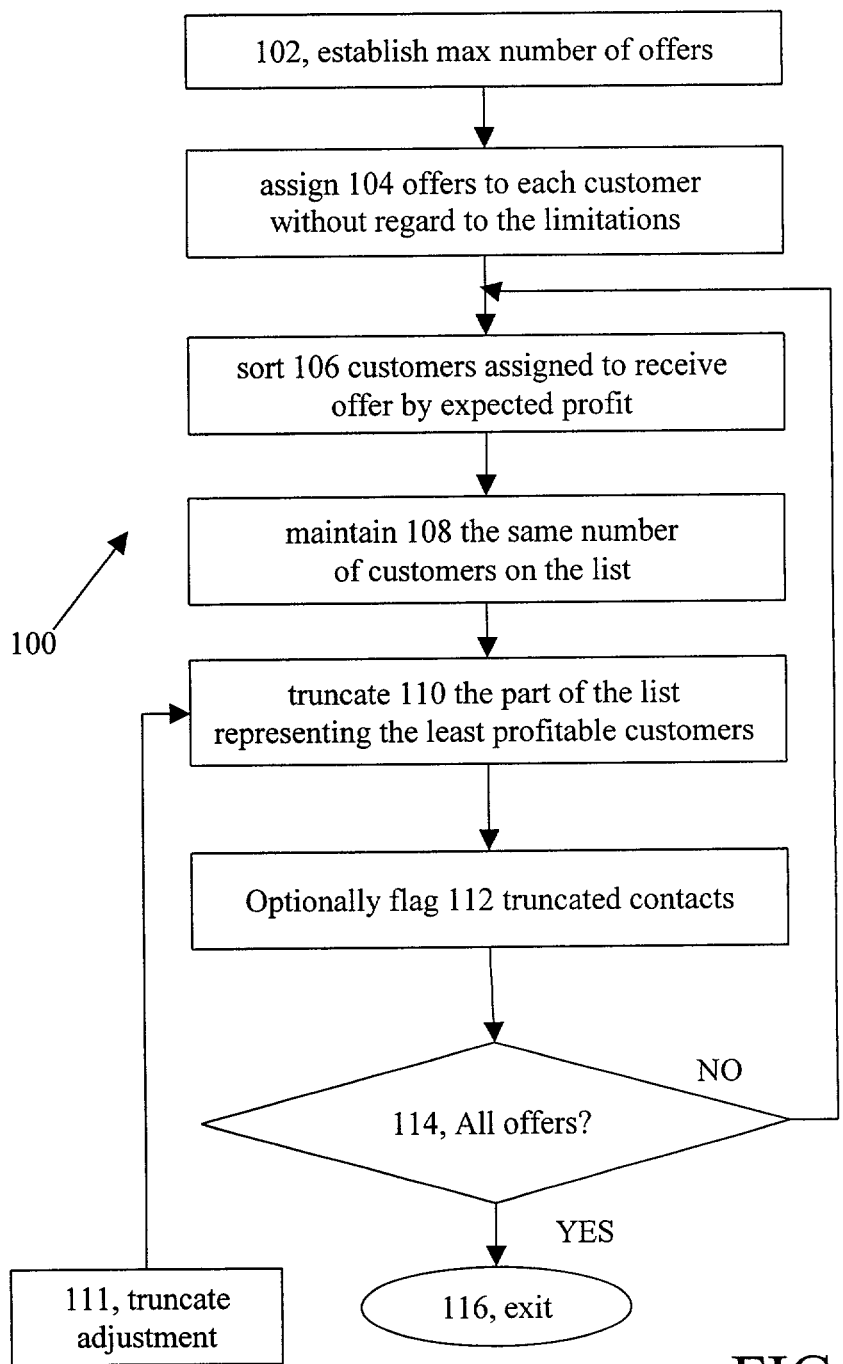
FIG. 7 is a flow chart of a contact optimization process when there are limits on the number of customers per offer.

Referring to FIG. 7, when there are limits on the number of customers per offer the software 32 offers a near optimal solution 100. For example, a user can only send 102 out a limited number of offers, e.g., 10,000 of a particular offer. That is a case where linear programming, given sufficient time and computational power could provide an optimal solution. In the contact optimization software 32 a close to optimal solution that is inexpensively obtained is provided. The software 32 assigns 104 offers to each customer without regard to the limitations on the quantity of each offer, using the contact optimization process 60. For each offer, the software 32 sorts 106 the customers assigned to receive that offer by expected profit.

For the number of available units, the software 32 keeps 108 the same number of customers on the list. The software truncates 110 the part of the list representing the least profitable customers to get that offer. The software 32 can flag 112 those contacts, which are truncated. The software 32 repeats 114 this for all offers for all customers and can thereafter exit 116.

Figure 8:
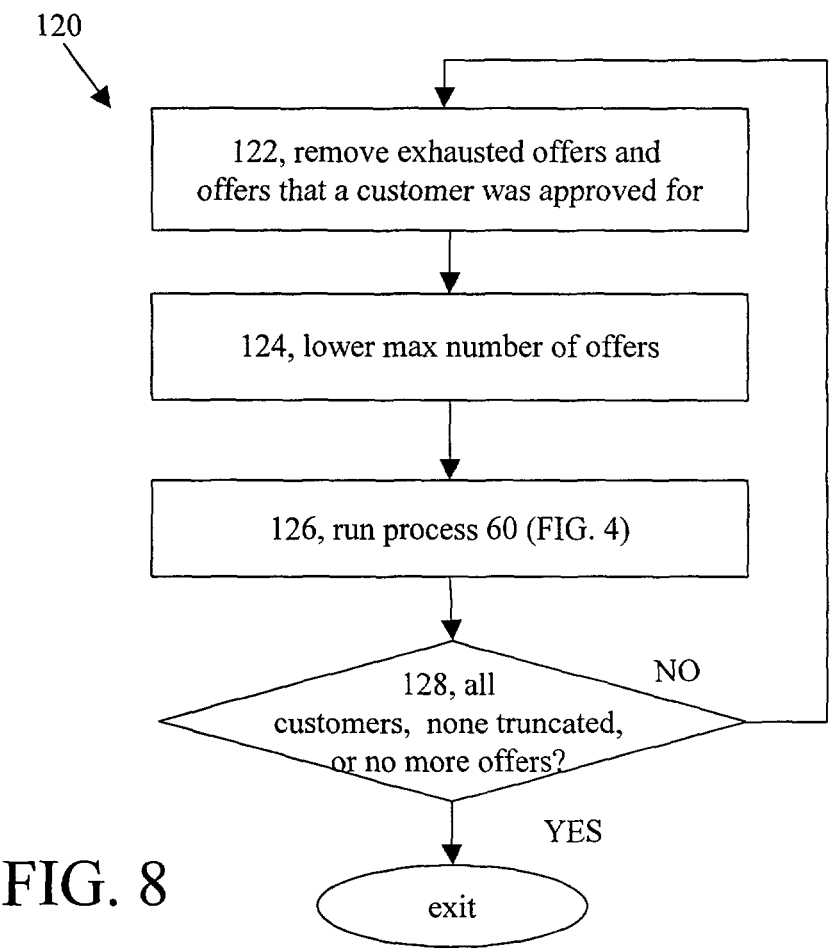
FIG. 8 is a flow chart of a contact optimization process used to assign offers to customers that were truncated.

Referring to FIG. 8, the software 32 can run a process 120 to assign offers to customers that were truncated. The process 120 operates on the customers that were flagged as having been truncated. The software 32 removes 122 any offers that are already exhausted where all contacts for the particular offer have already been chosen. Exhausted offers are not included in the next round of optimization. The software 32 also does not consider any offers that the truncated customers were already approved for. The software 32 also accordingly lowers 124 the maximum number of offers to send to the customer by the number of offers already approved for the customer. The process 60 is repeated 126 so the truncated customers have an opportunity to have other offers assigned to them, to make up for any offers that were taken away from them. This process is iterative and is repeated as necessary until no more customers have been truncated. The software 32 offers a near optimal solution with minimal computation compared to linear programming.

Referring back to FIG. 6, alternatively, truncating rather than occurring at the boundary of the exhaustion of the number of offers, e.g., at the 10,000 units of the offer, the software 32 could allow a user to adjust 111 or manipulate where to truncate. Thus, instead of truncating at 10,000 the user may truncate at 7,000 or 5,000 units of the offer and then run the process 60 again. In that way customers who would have been truncated may still have a second opportunity to receive a unit of the offer.

Another alternative examines the individual variance on the profitability of the offers for each customer. For a particular customer the expected profits may be about the same for all of the offers. That is, for some low variance customers it would not matter much which offer is sent. Another type of customer may have a large variance, so which offer is sent could provide a significant difference in profit.

The software 32 could take the offer away from the customer with the low variance first because it matters less which offer is sent to that customer. It could be given to the customer with the high variance. The software 32 can compute the variance across the offers for each customer and use the computed variance to rank which customers should be removed from receiving a particular offer.

Another feature of the software 32 when operating with limited capacity, is to have a report indicating how much profit the limited capacity costs the user.

Figure 9:
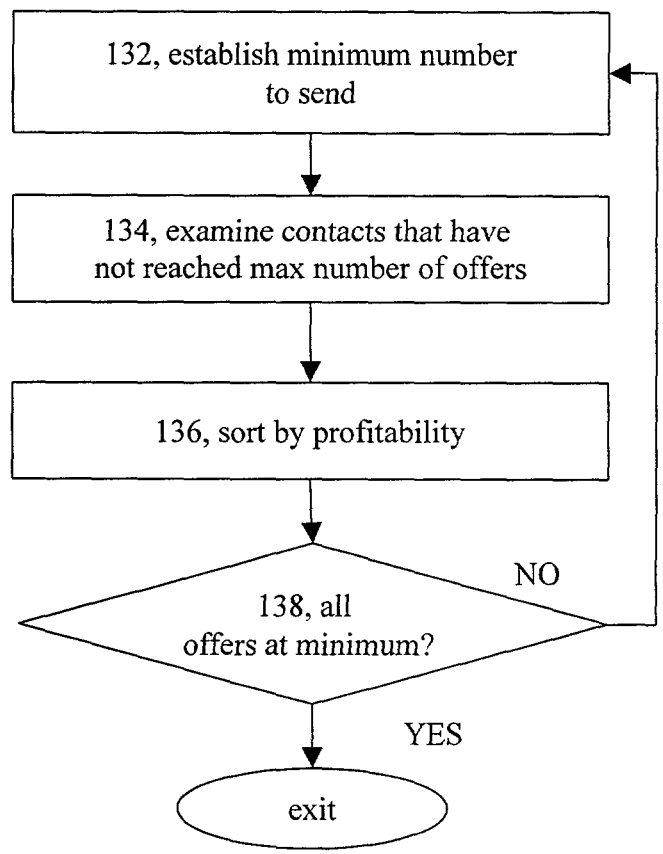
FIG. 9 is a flow chart of a contact optimization process used when operating with minimum capacity constraints on offers.

Referring to FIG. 9, another related matter is dealing with a "minimum capacity" constraint as discussed above. With a minimum capacity constraint, a user wants 132 to send out at least a certain number of offers, irrespective of profit. Such minimum capacity constraints are addressed after the optimization process 60 has made its assignments for all the customers. The software 32 would examine 134 those people that had not reached the maximum number of offers they are allowed to receive, and sort 136 them by profitability for any offers that have not reached the specified minimum capacity. The process can run 138 until all offers have reached minimum capacity.

The software 32 can include special support for what-if scenarios (i.e., store runs and make comparisons among them). The software can also generate reports. One report is a cross tab report that shows the number of people that originally qualified for a communication that were "removed" by another higher priority campaign.

The process 60 assumes that the expected profit of each offer is not affected by other offers that may be sent. However, it is possible to circumvent this assumption by presenting the system with all combinations of offers. Thus, for example, if there are offers A and B whose expected profit depends on whether they are sent alone or together, the system could instead be presented with 3 possible offers: X (corresponding to A alone), Y (B alone), and Z (both A and B). An (M,S) rule can be used to make these new offers mutually exclusive: (1, {X, Y, Z}). (M,S) rules can also be used to make combinations of offers mutually exclusive that would particularly lower each other's expected profits.

Other embodiments are within the scope of the appended claims.

For example, the process can be viewed as a general solution and can be applied to other situations besides marketing involving customers and offers. In general it could be applied to many other types of problems that are evaluated by linear programming techniques.

What is claimed is:

1. A computer-implemented method of determining a prioritized list of offers for use to contact potential customers, the method comprises:
    receiving by a computer expected profits for each offer in a set of offers for each potential customer in a group of potential customers;
    generating by the computer an ordered list of offers, by which to contact a potential customer from the group of potential customers, the offers in the ordered list of offers selected from the set of offers based on expected, composite profit of combinations of the offers for others of the potential customers in the group of potential customers,
    ordering by the computer offers in the list of offers according to the expected profit;
    repeating generating by the computer for subsequent others of the potential customers to produce corresponding ordered lists based on expected, composite profit of combinations of the offers for the subsequent potential customers independent from expected, composite profit of combinations of the offers for others of the potential customers in the group of potential customers; and
    producing by the computer a second list of offers that is a list provided from the ordered lists of offers from the one and subsequent others of the potential customers, with the second list based upon a budget for contacting the potential customers in the group, wherein
    the receiving, the generating, and the ordering are separately performed by the computer for each of the potential customers in the group of potential customers.

2. The method of claim 1 wherein
    generating further comprises: eliminating offers that are mutually exclusive from the ordered list of offers.

3. The method of claim 1 wherein
    generating further comprises: filtering out illegal offers from the set of offers for a member of the group of potential customers.

4. The method of claim 1 wherein,
    the method further comprises: producing an alternative ordered list of offers having N offers if a number of offers exceeds a number N of offers allocated for a potential customer.

5. The method of claim 1 further comprising:
    eliminating any offers that are not applicable to each customer based on eligibility rules for the offer or offers for which an expected profile for the potential customer is below a threshold amount; and when a rule is violated
    generating by the computer one or more alternative ordered lists of offers, and
    performing an ordered merge of the one or more alternative ordered lists of offers with the previously, generated ordered lists of offers to produce the ordered list to contact the potential customer.

6. A computer-implemented method of determining a prioritized number of offers to contact customers from a group of potential customers, the method comprises:
    first generating by a computer an ordered list of offers to be sent to a potential customer in the group of potential customers, with offers selected from a set of offers and ordering being based on expect composite profit of combinations of offers;
    second generating by the computer ordered lists for subsequent others of the potential customers, with offers selected from a set of offers and ordering being based on expect composite profit of combinations of offers for others of the potential customers;
    producing a second list of offers from the ordered lists of offers from the one and subsequent others of the potential customers, with the second list being further based upon a budget for contacting the potential customers in the group;

ordering offers in the second list by expected profit, wherein
the first generating and the second generating are separately performed by the computer for each of the potential customers in the group of potential customers.

7. The method of claim 6 further comprising for a potential customer:
eliminating any offers that are not applicable to the potential customer based on eligibility rules for the offer or offers for which an expected profit for the potential customer is below a threshold amount; and
producing a proposed solution having an ordered list of N offers where N is the lesser of the total remaining offers and the maximum number of offers allowed for the potential customer.

8. The method of claim 7 wherein
the proposed solution is represented as a bit string of a length that is equal to the total of the remaining offers.

9. The method of claim 8 wherein
the proposed solution is checked against rules of the form (M,S), meaning at most M offers from set S can be sent to a potential customer.

10. The method of claim 9 wherein
if an (M,S) rule is violated, a list of new alternative proposed solutions is generated by:
determining a number of bits T>M from the set S that indicate offers should be sent in the proposed solution;
generating new alternative proposed solutions, each proposed solution containing new alternative offers, wherein a new alternative offer is represented in a bit string by setting T-M number of bits that are not a part of the set S, and which immediately follow a rightmost one bit R1 in the proposed solution.

11. The method of claim 10 further comprising:
generating alternative proposed solutions based on all combinations of the T one bits up to R1 and any zero bits in set S between R1 and R2 containing M one bits.

12. The method of claim 11 wherein
a new alternative proposed solution is merged with any preceding list of proposed solutions.

13. The method of claim 12 wherein the list of proposed solutions is checked in decreasing order of profitability.

14. The method of claim 6 wherein the second list of offers further comprises:
sorting the second list of offers by return on investment; and
truncating offers at the bottom of the second list of offers.

15. The method of claim 6 wherein the second list of offers further comprises:
sorting the second list of offers by return on investment; and
rerunning flagged customers after removing exhausted offers and offers that the flagged potential customers were already approved for, while lowering a maximum number of allowed offers for the flagged potential customers.

16. The method of claim 12 wherein
truncating occurs at a boundary defined by a constraint on the method.

17. The method of claim 12 wherein
truncating is selectable by a user.

18. The method of claim 17 wherein
truncating occurs based on individual variance of profit from a potential customer with potential customers having low variance being truncated for certain offers before customers having high variance.

19. A computer program product residing on a computer readable hardware storage device for determining a prioritized number of offers to contact potential customers from a group of potential customers, comprises instructions to cause a computer to perform:
first generating by a computer an ordered list of offers to be sent to a potential customer in the group of potential customers, with offers selected from a set of offers and ordering being based on expect composite profit of combinations of offers;
second generating by the computer ordered lists for subsequent others of the potential customers, with offers selected from a set of offers and ordering being based on expect composite profit of combinations of offers;
producing a second list of offers from the ordered lists of offers from the one and subsequent others of the potential customers, with the second list of offers based upon a budget for contacting the potential customers in the group; and
ordering offers in the second list by expected profit, wherein
the first generating and the second generating are separately performed by the computer for each of the potential customers in the group of potential customers.

20. The computer program product of claim 19 further comprising for a potential customer instructions to:
eliminate any offers that are not applicable to the potential customer based on eligibility rules for the offer or offers for which an expected profit for the potential customer is below a threshold amount; and
produce a proposed solution having an ordered list of N offers where N is the lesser of the total remaining offers and the maximum number of offers allowed for the potential customer.

21. The computer program product of claim 19 wherein
the proposed solution is represented as a bit string of a length that is equal to the total of the remaining offers.

22. The computer program product of claim 19 further comprising instructions to:
check a proposed solution against rules of the form (M,S), meaning at most M offers from set S can be sent to a potential customer.

23. The computer program product claim 22 wherein
if an (M,S) rule is violated, the computer program product further comprises instructions to:
generate a list of new alternative proposed solutions by instructions that:
determine a number of bits T>M from a set S that indicate offers should be sent in the proposed solution;
generate new alternative proposed solutions, the proposed solutions containing new alternative offers, with the new alternative offer represented in a bit string by setting T-M number of bits that are not a part of the set S, and which immediately follow a rightmost one bit R1 in the proposed solution.

24. The computer program product of claim 23 further comprising instructions to:
generate alternative proposed solutions based on all combinations of the T one bits up to R1 and any zero bits in set S between R1 and R2 containing M one bits.

25. The computer program product of claim 24 wherein
the new alternative proposed solutions are merged with any preceding list of proposed solutions.

26. The computer program product of claim 19 wherein the second list of offers further comprises:
 truncating offers at the bottom of the second list of offers.

27. A system for determining a prioritized number of offers to send to potential customers from a group of customers, the system comprises:
 a computer; and
 a computer readable medium storing a computer program product for determining the prioritized number of offers, comprises instructions to cause the computer to:
  first generating by a computer an ordered list of offers to be sent to a potential customer in the group of potential customers, with offers selected from a set of offers and ordering being based on expect composite profit of combinations of offers;
  second generating by the computer ordered lists for subsequent others of the potential customers, with offers selected from a set of offers and ordering being based on expect composite profit of combinations of offers;
  producing a second list of offers from the ordered lists of offers from the one and subsequent others of the potential customers, with the second list of offers based upon a budget for contacting the potential customers in the group; and
  ordering offers in the second list by expected profit, wherein
  the first generating and the second generating are separately performed by the computer for each of the potential customers in the group of potential customers.

28. The system of claim 27 wherein
the offers are represented as a bit string of a length that is equal to the total number of the viable offers.

29. The system of claim 27 wherein
the offers are checked against rules of the form (M,S) meaning at most M offers from set S can be sent to a potential customer.

30. The system of claim 27 wherein the instructions to produce the second list of offers further comprises instructions to:
 truncate offers at the bottom of the second list of offers.

* * * * *